E0152 XR 3,483,327

179/2AS

3

INVENTOR
ARNOLD SCHWARTZ

BY *Strauch, Nolan, Neale, Nies and Bronaugh*
ATTORNEYS

Dec. 9, 1969 A. SCHWARTZ 3,483,327

TRANSPONDER FOR MONITORING T.V. PROGRAM SELECTIONS

Filed March 25, 1965 4 Sheets-Sheet 2

INVENTOR
ARNOLD SCHWARTZ

BY Strauch, Nolan, Neale, Nies and Bronaugh
ATTORNEYS

TRANSPONDER FOR MONITORING T.V. PROGRAM SELECTIONS

Filed March 25, 1965 4 Sheets-Sheet 3

INVENTOR
ARNOLD SCHWARTZ
BY Strauch, Nolan, Neale, Nies and Bronaugh
ATTORNEYS

TRANSPONDER FOR MONITORING T.V. PROGRAM SELECTIONS

Filed March 25, 1965 4 Sheets-Sheet 4

INVENTOR
ARNOLD SCHWARTZ

BY Strauch, Nolan, Neale,
Nies and Bronaugh
ATTORNEYS

United States Patent Office 3,483,327

Patented Dec. 9, 1969

3,483,327

TRANSPONDER FOR MONITORING T.V. PROGRAM SELECTIONS

Arnold Schwartz, Brooklyn, N.Y., assignor, by mesne assignments, to Control Data Corporation, Washington, D.C., a corporation of Delaware

Filed Mar. 25, 1965, Ser. No. 442,638

Int. Cl. H04m *11/08*

U.S. Cl. 179—2 11 Claims

ABSTRACT OF THE DISCLOSURE

A transponder for monitoring T.V. program selections in which the transponder and receiver unit is located remote from the T.V. receiver to be monitored, and provides an output signal which indicates whether the T.V. is on or off, and if on, to which channel it is tuned. The receive unit in response to a signal received from a transmitter operatively connected to the T.V., connects the proper contact of a multiple switch to ground, which controls a bistable circuit element to prevent additional pulses from being transmitted to a central station. The receive unit also controls the connection of a second multiple switch to prevent additional output signals from being transmitted if the T.V. is off.

This invention relates to a system of monitoring television broadcast program selections at receivers which is used for determining whether a television receiver is turned on or off, and if on, the channel to which the receiver is tuned, and more particularly, to an improved apparatus for use at the location of the television receiver.

Persons responsible for the content of television programs and advertisers are keenly interested in the number of persons viewing any particular program. Sampling techniques have been used for polling households in an effort to obtain meaningful information. Most polling techniques are subject to errors which can have a significant influence on the final results of the poll making them unreliable and untrustworthy.

To avoid disturbing households, it has been the practice to make advanced arrangements with television set owners and to supply special apparatus to the television sets in the household of such participating owners as may be determined to provide a representative cross-section of the viewing audience. This apparatus on each television receiver is connected by a special signal channel, customarily a telephone line, that extends to a central data processing station. The central station then has the ability to interrogate the apparatus attached to the television receiver of each participating subscriber and receive an indication identifiable with that subscriber as to whether or not the television receiver is turned on, and if on, to what channel the tuner is set. This interrogation is done without disturbing and without the knowledge of the participating subscriber.

While the foregoing system has eliminated many of the objectionable features of polls made by telephone or household visits, it has been found that significant errors yet arise as a result of the nature of the apparatus attached to the television receiver which transmits the identifying information to the central station.

In the prior apparatus, it was frequently found that no signal was received from a participating subscriber on many interrogations, thereby indicating that the sampling equipment was malfunctioning. Upon making a service call, it was frequently found that failure of signal response resulted from disconnecting the power supply to the apparatus attached to the television receiver. Power was disconnected frequently because the television set receiver would be turned off by means of a wall switch rather than the on and off control on the television receiver. When power was turned off to the television receiver by a wall switch, the power was also removed from the monitoring apparatus so that it could not respond to interrogations from the central office. Also, because the monitoring apparatus was connected to a telephone line which served as the signal channel to the central station, the monitoring apparatus could not be moved from the location where the television receiver was located when the monitoring apparatus was installed. Therefore, when for any reason, the television receiver would be moved to a different location such as for example, from the living room to a bedroom, the monitoring apparatus would become inoperable and hence would give no indication of operating at all. A similar lack of response was found when the television receiver was removed from the house for repair.

The principal object of the present invention is to provide novel monitoring apparatus which is not subject to the foregoing disadvantages thereby rendering the results more reliable and reducing unnecessary service calls.

Another object of this invention is to provire a novel monitoring apparatus wherein the transponder equipment responsive to the interrogation signals from the central office is remotely located relative to the television receiver to thus allow the television receiver to be moved within the house and is operable even though power to the television receiver may be turned off by a wall switch.

A further object resides in providing a novel radio frequency link between a tuning channel indicator on the television receiver and the remotely located transponder unit which utilizes the normal wiring in the home or apartment building.

Yet another object resides in providing vibrating reed tone generators tuned to different frequencies at the television receiver for modulating a radio frequency signal and a receiver at the transponder unit which is remotely located in the same house that has sympathetically tuned reed relays for setting up a matrix circuit to identify whether the television receiver is on or off, and if on, the particular channel to which the television receiver is tuned.

These and other objects of the invention will become more fully apparent from the claims, and from the description as it proceeds in conjunction with the appended drawings wherein:

Figure 1:
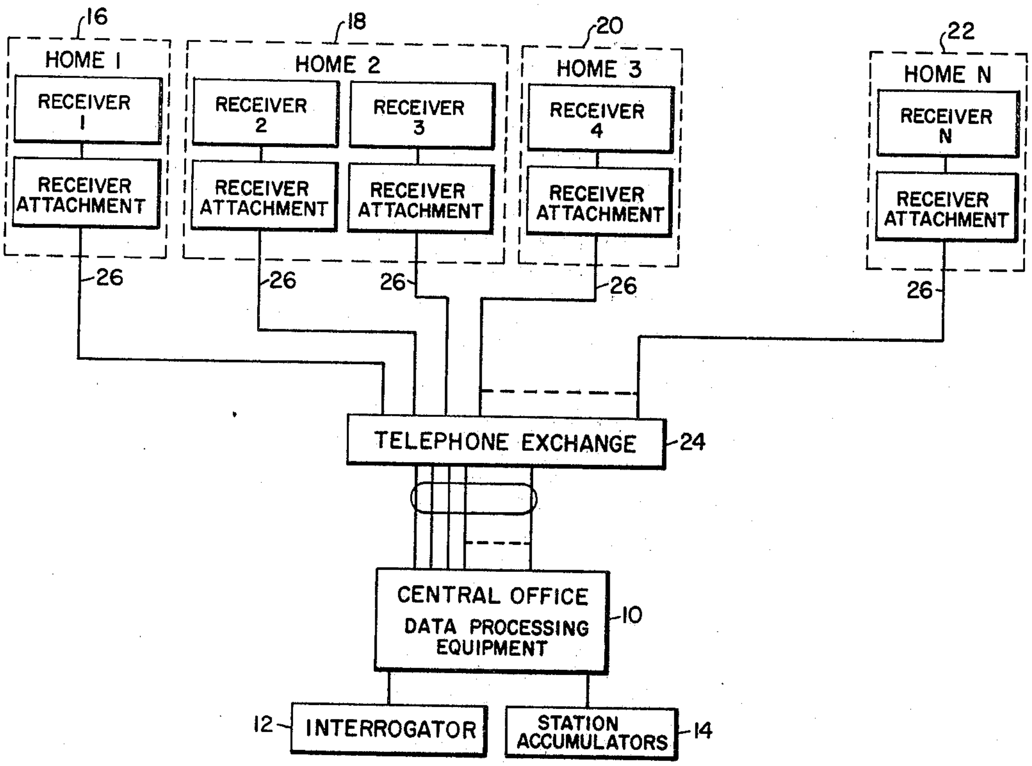
FIGURE 1 is a schematic illustration in block diagram form of a known monitoring system in which the present invention is adapted to be used.

Referring now to FIGURE 1, a monitoring system that has been used in the past and with which the present invention is adapted for use, may comprise a central office 10 having suitable data processing equipment including an interrogator 12 and accumulators 14 for the various broadcast stations in the area being monitored. Central office 10 is connected to the various homes 16, 18, 20 and 22 where television broadcast receivers being monitored are located via telephone exhcange 24. Customarily separate lines 26 are leased by the monitoring bureau and installed in the home involved for the purpose of monitoring the programs being watched.

Figure 2:
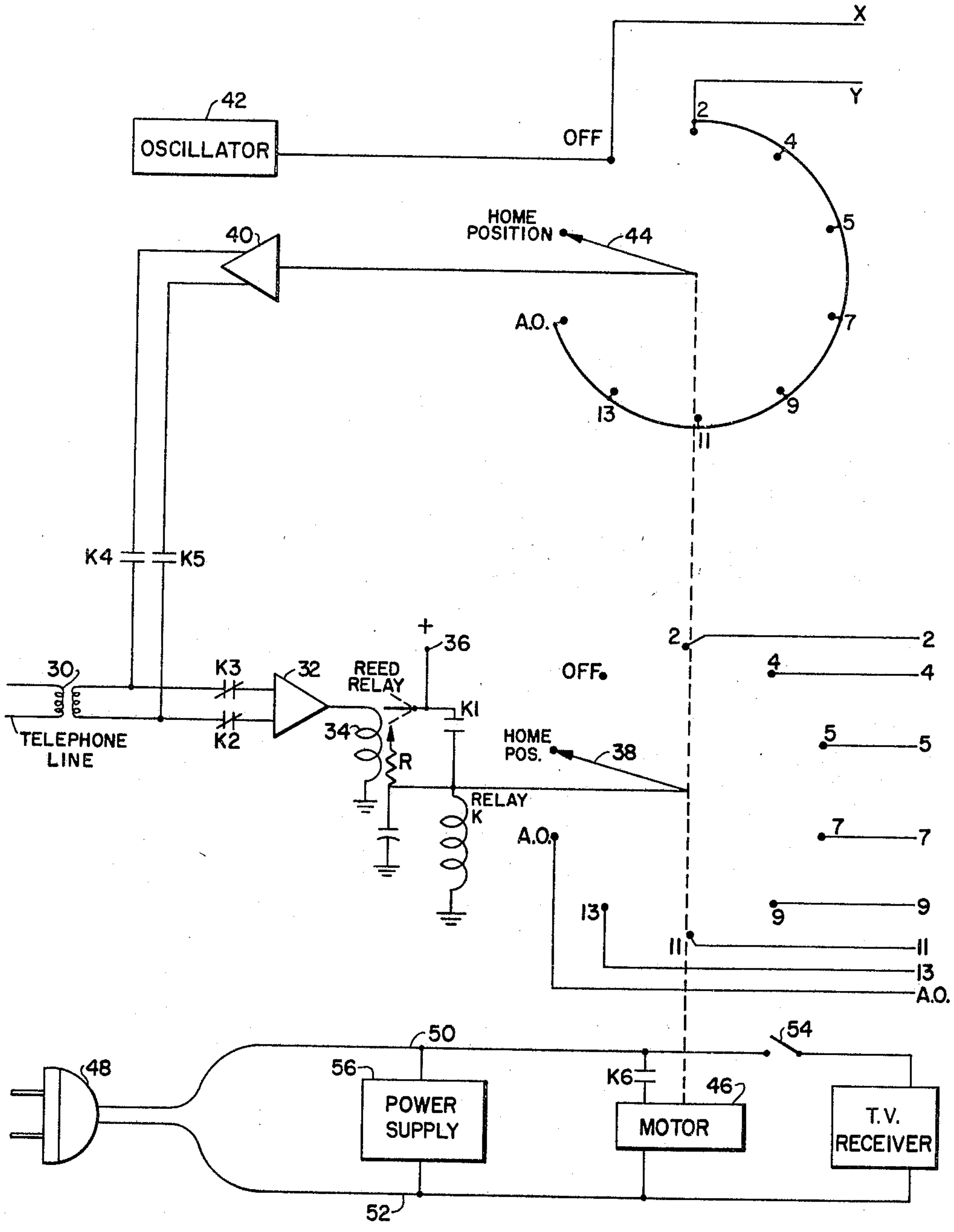
FIGURE 2 is a schematic diagram of a previously known transponder circuit arrangement with which the present invention is adapted for use.

In FIGURE 2, a typical system is illustrated for interrogating the monitoring equipment which may comprise a transformer 30 coupled between the telephone line and the transponder unit at the home being monitored. Transformer 30 is connected to a receive unit amplifier 32 through normally closed switch contacts K–2 and K–3. Contacts K–2 and K–3 which are associated with amplifier 32, are normally closed and are opened when relay K or other appropriate bistable circuit element, is energized as a result of the reception of an interrogation signal from the central office which may, for example, be a 200 cycle signal. The incoming interrogation signal is fed through amplifier 32 to cause reed relay 34 to vibrate. Once reed relay 34 begins vibration and relay K energizes, a holding circuit through normally open contacts K–1 is established between a point 36 of fixed potential and ground.

The junction point between contacts K–1 and relay K is connected to the wiper arm 38 of a sequencing or stepper switch which will be described below. Relay K is de-energized when wiper arm 38 engages an associated contact having ground or a negative potential. The system is so arranged that as wiper arm 38 rotates clockwise, the first contact reached that has the requisite voltage level to de-energize relay K is the contact OFF if the receiver is not turned on, or the contact corresponding to the number of the channel to which the television receiver is tuned in the event the receiver is turned on.

In this prior system for replying back to the central office, the output of transmitter 40 is connected to the telephone line through normally open contacts K–4 and K–5 which are closed so long as relay K is energized. An oscillator 42 operating at a suitable audio frequency such as 1500 cycles is connected to the OFF terminal of a second section of the sequencing or stepper switch so that the tone from oscillator 42 will be transmitted as a pulse as wiper arm 44 moves across its OFF contact. If the television receiver being monitored is not turned on, the connection between terminals X and Y is open as will be explained below; thus no further pulse of the tone from oscillator 42 can be received at the central station. If the television receiver is turned on, a circuit between terminals X and Y is completed in the prior system by a switch operated with the on-off switch for the television receiver to thus provide the tone from oscillator 42 to each of the contacts 2, 4, 5, 7, 9, 11, 13 and a position A.O. meaning "all others." These contact numbers correspond with the broadcast channels that can be received at a particular geographic location for which the illustrated embodiment has been devised.

In normal operation, if the receiver is tuned to channel 2, the tone is provided when wiper arm 44 engages contact 2; but relay K de-energizes prior to the time wiper arm reaches the next contact 4, and contacts K–4 and K–5 open to thus permit only two pulses of the tone from oscillator 42 to be transmitted to the central station. If, for example, the receiver is tuned to channel 13, eight pulses, corresponding to the number of contacts wiper arm 44 would engage prior to de-energization of relay K, would be transmitted, to the central station in the illustrated embodiment. The time necessary for relay K to de-energize sufficiently delays the opening of contacts K–4 and K–5 to allow the proper number of pulses to be transmitted. Thus, the number of pulses received is used to identify the station to which the television receiver being monitored is tuned.

Wiper arms 38 and 44 may be mechanically linked together and driven by a suitable motor 46 such as is commonly used in timing devices. Motor 46 is connected to the house voltage by plug 48 which may be plugged separately into a house wall outlet. However, to avoid the danger of plug 48 from being removed, the power on leads 50 and 52 is normally taken from the inside of the television receiver being monitored at a point between the wall plug 48 and on-off switch 54 of the television receiver.

In order that receiver 32, transmitter 40 and oscillator 42 are all operable even when switch 54 is off, a power supply 56 is connected as illustrated in FIGURE 2 to be in parallel with motor 46. Once contacts K–6 close, motor 46 advances wiper arms 38 and 44 one complete revolution to the OFF position and a separate circuit conventional in stepper switches (not shown) bypassing contacts K–6 is established so that the wiper arms will always advance to and stop at their illustrated home position.

In the prior art systems, the contacts associated with wiper arm 38 have been wired directly to a suitable switching arrangement (not shown) such as wafer switch connected to the rotatable shaft of the tuner on the television receiver to be monitored. The entire circuitry and all hardware illustrated in FIGURE 2 are located on or adjacent to the television receiver. Also, a separate and special telephone line will have been installed with the outlet at the location of the television receiver.

One problem that has arisen is that the participating subscribed occasionally moves his television receiver into another location—such as from the living room to a bedroom during an illness, etc. The connection to the telephone line is thus opened and the monitoring bureau, in response to an interrogation signal, receives no answer and thus must make a service call to determine why the system is not functioning. If the subscriber wants to use the set in two or more rooms, this necessitates installation of additional telephone wire connections and additional cost, or replacing this subscriber in the survey system.

Another common problem encountered with the prior system which results in unnecessary service calls, arises when the outlet to which the television receiver is connected can be controlled from a wall switch. When the wall switch is turned off, no power is available to operate the system to indicate the television receiver is off, and the monitoring bureau must make a service call to determine the reason for the loss of the response of this subscriber's set to its interrogating signal.

Figure 3:
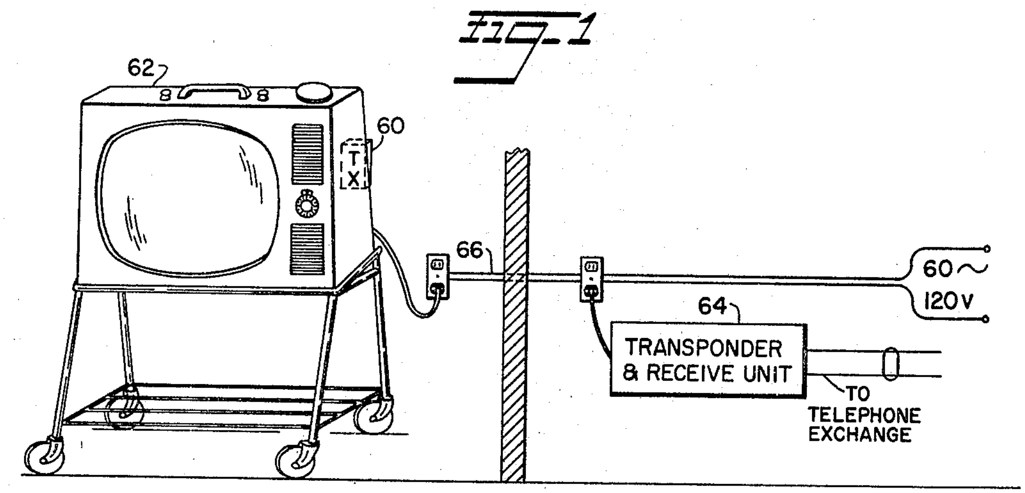
FIGURE 3 is a block diagram showing the arrangement of the parts of the present invention.

To obviate the foregoing two major problems. the present invention provides a monitoring arrangement as illustrated in FIGURE 3 for the home which is divided into two parts, one part 60 located at the television receiver 62 and the other part 64 located at an obscure location in the house or apartment building such as a closet. Basically, part 60 is a transmitter which transmits a radio frequency signal to a receiver in the transponder and receive unit located in the closet. To reduce the power requirements for the radio frequency signal, it is fed into the house wiring and picked up by a receive unit portion of the transponder 64. The telephone line is connected to the transponder and receive unit 64 and thus is at a fixed location whereas the transmitter 60 may be moved with television receiver 62 anywhere in the building (or in the neighborhood so long as a power transformer is not located between transmitter 60 and transponder receive unit 64) and the system will still provide reliable response to the interrogating equipment at the central office.

The transponder portion 64 may contain all the circuitry described in connection with FIGURE 2, and in addition the receive circuit and switching circuitry described in connection with FIGURE 5.

Figure 4:
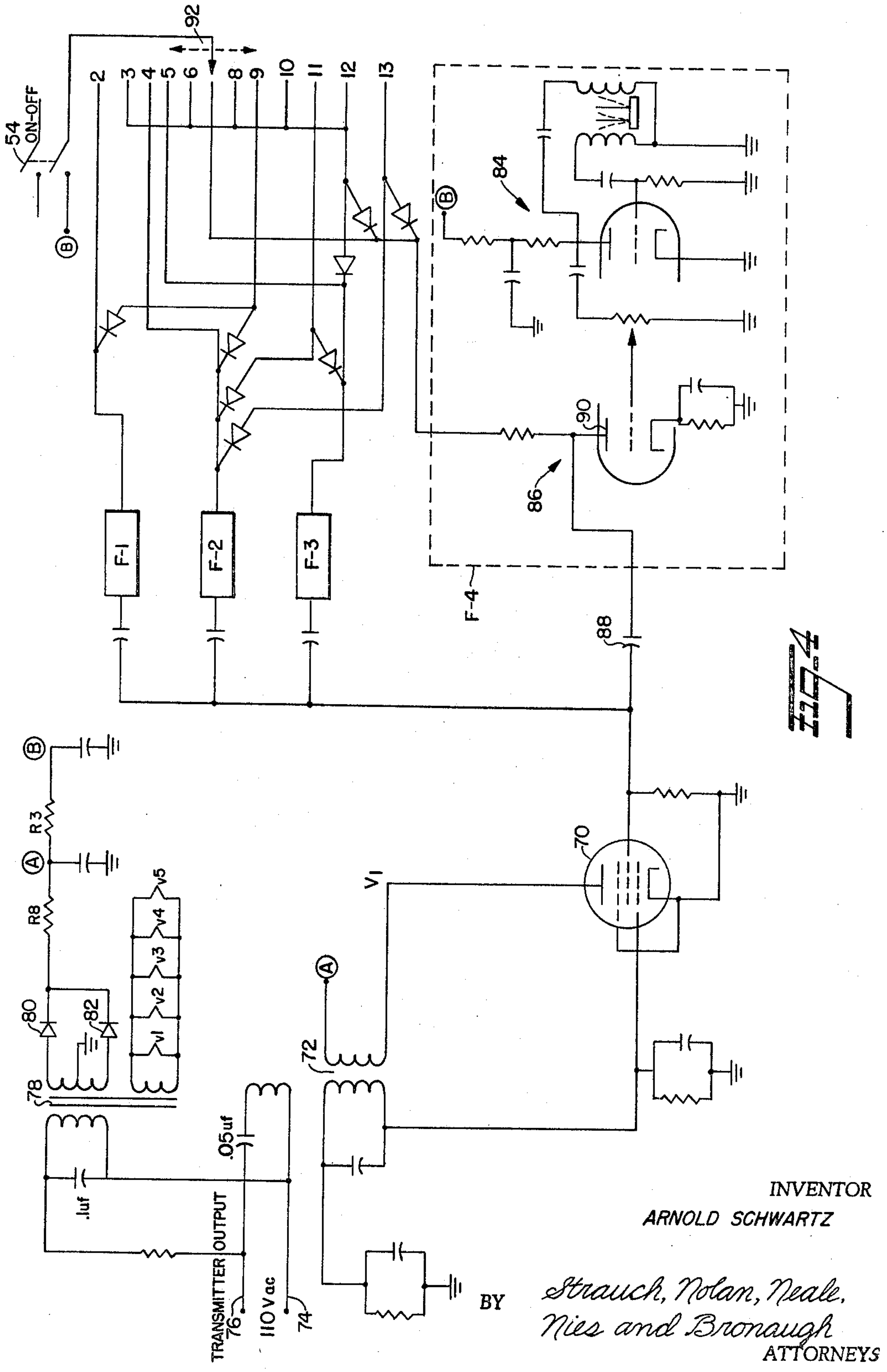
FIGURE 4 is a schematic diagram showing the novel transmitter apparatus attached to the television receiver being monitored.

Referring now to FIGURE 4, the circuitry of transmitter 60 that is attached to the rear of the television receiver to be monitored is illustrated. Basically, the transmitter comprises a continuously running oscillator 70 which may operate at a frequency on the order of 200 kc. and have a power output of 20 to 50 milliwatts that is coupled by transformer 72 to power lines 74 and 76. A power supply transformer 78 and rectifiers 80 and 82 provide D.C. at terminal A for oscillator 70 and at terminal B for tone generator stages F–1, F–2, F–3 and F–4. The filaments of all the tubes are continuously energized.

The output signal from oscillator 70 is modulated with an audio frequency from one or more of the tone generator stages F–1 through F–4 depending upon the station to which the television receiver is tuned. Each tone generator stage comprises an oscillator stage 84 which may be tuned to a lower frequency such for example in the range of 100 to 1500 cycles. In the embodiment shown, a vibrating reed type oscillator is used and the output applied to a buffer stage 86 which in turn is connected through capacitor 88 to modulate the output of radio frequency oscillator 70. Each of tone generators F–1 through F–3 may be of indentical construction to tone generator F–4, excepting that each is tuned to a different frequency.

Buffer stage 86 in each tone generator serves also as a switch so that the tone will be transmitted only if the buffer is energized. In the illustrated embodiment, buffer stage 86 is normally inoperative by virtue of the lack of B+ on anode 90. B+ to anode 90 is applied through a circuit including a selector switch 92 which is adapted to move with the rotation of the shaft of the tuner in the television receiver. The wiper arm may be connected to B+ at terminal B through a separate set of contacts on switch 54 that are closed when the television receiver is turned on. Thus, when the television is turned off, oscillator 70 produces an unmodulated signal; when the television receiver is turned on, B+ is applied through the slide of selector switch 92 to the appropriate tone generator by a switch circuit such as the illustrated diode matrix.

In the illustrated embodiment, the tone generators F–1 through F–4 are connected according to the following table.

| Broadcast channel: | Tone generator |
|---|---|
| 2 | F–1 |
| 4 | F–2 |
| 5 | F–3 |
| 7 | F–4 |
| 9 | F–1 and F–2 |
| 11 | F–2 and F–3 |
| 13 | F–2 and F–4 |
| All others | F–3 and F–4 |

Figure 5:
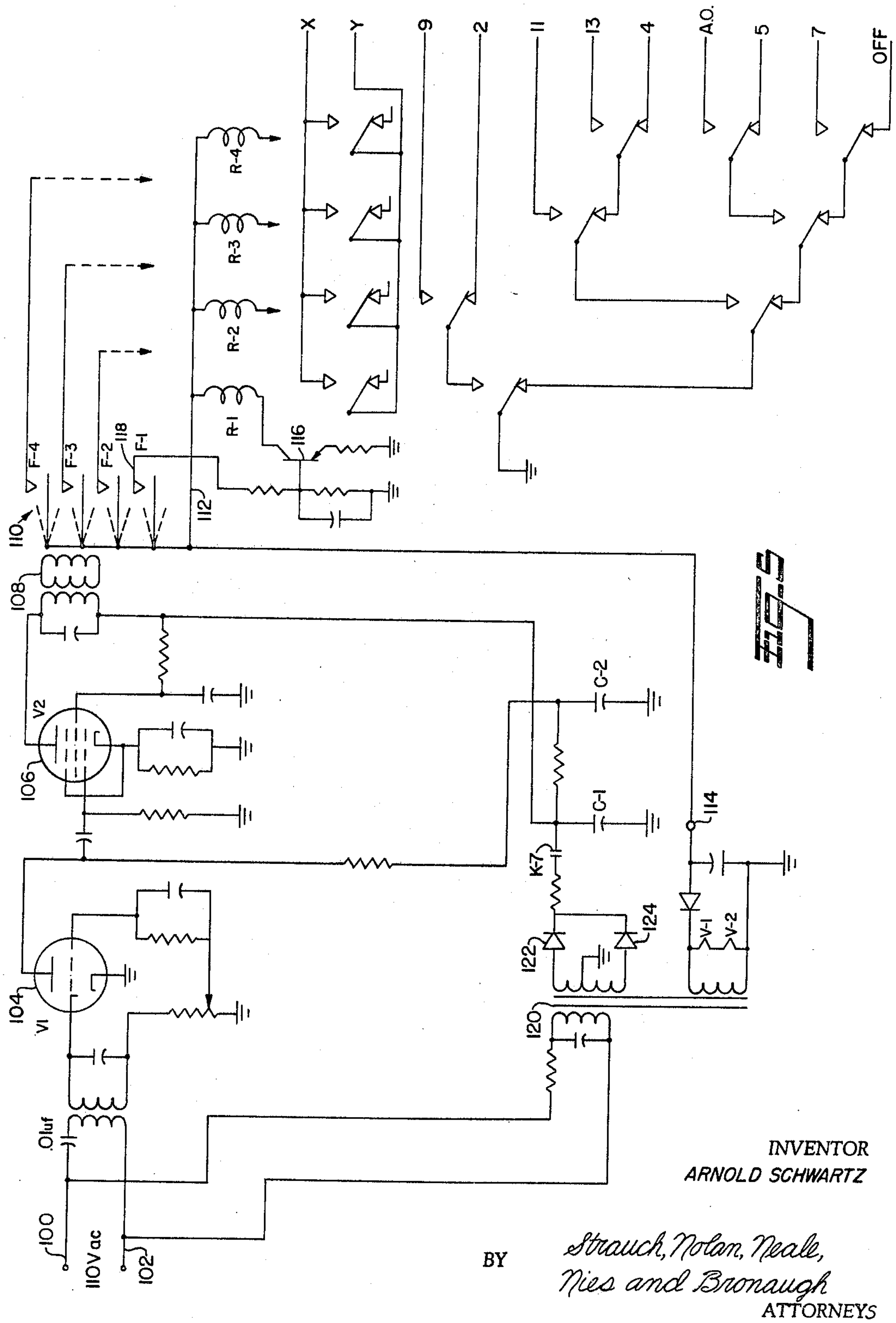
FIGURE 5 is a schematic diagram of the novel reciver apparatus adapted to be remotely located, as in a closet, from the television receiver together with the transponder circuit of FIGURE 2 in accordance with the present invention.

Referring now to FIGURE 5, the receiver portion of the circuit is illustrated. The ratio frequency signal is carried along A.C. power lines 100 and 102 and received by tube 104 which serves as a detector amplifier. Its output is connected to tube 106 which is a power amplifier adapted to supply the audio frequency or frequencies with which oscillator 70 (FIGURE 4) was modulated, through a matching transformer 108 to signal channels that are selectively tuned to each of the four frequencies used at the transmitter of FIGURE 4. In the illustrated embodiment, these signal channels comprise reed relays 110 tuned for each of the toner generators of FIGURE 4.

Each signal channel contains a separate relay R–1, R–2, R–3 and R–4 which is energized by reception of the audio frequency from the corresponding toner generator of FIGURE 4. Relay R–1 is connected at one terminal to lead 112 which is supplied with −26 v. D.C. from a power supply terminal 114. The other terminal of relay R–1 is connected in series with a normally non-conducting transistor 116 that is biased on when the associated reed F–1 vibrates to contact its terminal 118. Relay R–1 thus remains energized for the period that reed 118 continues to vibrate.

Relays R–2, R–3 and R–4 are connected in a manner identical to that described in connection with relay R–1 and hence are only shown diagrammatically in FIGURE 5.

When any one (or more) of relays R–1 to R–4 is energized, the associated contact(s) in the circuit between terminals X and Y is closed to thereby close a normally open circuit. Referring now to the upper right hand corner of FIGURE 2, closing the circuit between X and Y has the effect of connecting the tone from oscillator 42 to each of the numbered contacts on the switch associated with wiper arm 44.

With continued reference to FIGURE 2, contacts off, 2, 4, 5, 7, 11, 13 and A.O. are connected to the correspondingly marked leads in FIGURE 5. These leads in FIGURE 5 are connected through a relay tree arrangement controlled by relays R–1, R–2, R–3 and R–4 so that the one corresponding to the channel to which the television receiver is tuned is connected to ground and the others are all open. For example, if the receiver is tuned to channel 2, then tone generator F–1 is energized to modulate oscillator 70 (FIG. 4). The modulated signal is transmitted to detector amplifier 104 and coupled to reed relays 110. Reed 118 being tuned to tone generator F–1 is energized and energizes relay R–1. The energization of R–1 closes its associated contacts, thereby closing the circuit between terminals X and Y and connecting, through the lead marked 2, contact 2 of the stepper switch in FIG. 2 to ground. Thus, as wiper arm 38 (see FIGURE 2) moves across the various contacts, it eventually finds the contact connected to ground and thus shorts out relay K. The system thereafter functions identically as described above in connection with FIGURE 2.

Referring again to FIGURE 5, the power supply for the receiver includes power transformer 120 which, with rectifiers 122 and 124, produces B+ for tubes 104 and 106. Normally open switch contacts K–7, connected between the power supply and tubes 104 and 106, are associated with relay K of FIGURE 2 which is energized by the interrogation signal received over the telephone line and de-energized when wiper arm 38 engages the grounded contact as explained above. When relay K becomes de-energized, contacts K–7 open to thus disable tubes 104 and 106 and thereafter the portion of the transponder receiver circuit shown in FIGURE 5 remains inactive.

From the foregoing, it is apparent that the transponder unit of the present invention will respond tc interrogation signals from the central office to indicate the television receiver is off—though the monitoring equipment is functioning properly—even though power to the television receiver has been turned off by a wall switch or the television receiver is out of the house for repair. Use of the transponder unit of this invention additionally makes it possible to move the television receiver from room to room without loss of the receiver from the sampling base thereby improving the reliability of the results.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A system for monitoring the condition of a television broadcast receiver having:

(a) a transmit unit attached to said receiver including a radio frequency oscillator and means for modulating the output signal of said oscillator to identify the broadcast channel to which said receiver is tuned;

(b) a transponder unit located at a fixed position in the same building as said television receiver but remote therefrom and connected to a source of operating power independent of the supplying of operating power to said monitored television receiver;

(c) a central office including data processing equipment for registering information concerning the station to which said receiver is tuned;

(d) a signal channel connected between said central station and said transponder;

(e) a receive unit located with said transponder for receiving the output frequency signal from said transmit unit, said receive unit providing an output signal condition corresponding to the channel to which said receiver is tuned; and (f) means in the transponder unit responsive to an interrogation signal from said central office for indicating whether said television receiver is on, and if so, the broadcast channel to which said receiver is tuned;

(g) said radio frequency output signal from said transmit unit being coupled to wiring in the building that supplies operating power to both the television receiver and said receiver unit.

2. A system for monitoring the condition of a television broadcast receiver having:

(a) a transmit unit attached to said receiver including a radio frequency oscillator and means for modulating the output signal of said oscillator to identify the broadcast channel to which the receiver is tuned;

(b) a transponder unit located at a fixed position in the same building as the television receiver but remote therefrom and connected to a source of operating power independent of the supplying of operating power to said monitored television receiver;

(c) a central office including data-processing equipment for registering information concerning the station to which said receiver is tuned;

(d) a signal channel connected between said central station and said transponder, said signal channel comprising a telephone line;

(e) a receiver unit located with said transponder for receiving the output radio frequency signal from said transmit unit, said receive unit providing an output signal condition corresponding to the channel to which said receiver is tuned;

(f) means in the transponder unit responsive to an interrogation signal from said central office for indicating whether said television receiver is on, and if so, the broadcast channel to which said receiver is tuned;

(g) said transponder unit including a bistable circuit element which is energized by reception of said interrogation signal and de-energized at a time interval thereafter that is determined by whether the television receiver is on, and if so, the broadcast channel to which the receiver is tuned; and, (h) means operated by said bistable circuit element for rendering said receiver unit operable to produce its output signal condition only during the time interval said bistable circuit element is energized.

3. A system for monitoring the condition of a television broadcast receiver having:

(a) a transmit unit attached to said receiver including a radio freqency oscillator and means for modulating the output signal of said oscillator to identify the broadcast channel to which said receiver is tuned;

(b) a transponder unit located at a fixed position in the same building as said television receiver but remote therefrom and connected to a source of operating power independent of the supplying of operating power to said monitored television receiver;

(c) said transponder unit including two multiple position switches with each one having a wiper arm driven from a common shaft, motor means for rotating said shaft, means connecting the contacts of one switch to individual terminals containing a unique signal indicative of the channel to which said television receiver is tuned, a continuously operating signal generator, means connecting the output signal from said signal generator to one contact of the other switch, means connecting said one contact of the other switch to other contacts of said other switch through a circuit in said receive unit that is closed only when said television receiver is on;

(d) a central office including data processing equipment for registering information concerning the station to which said receiver is tuned;

(e) a signal channel connected between said central station and said transponder, said signal channel comprising a telephone line;

(f) a receive unit located with said transponder for receiving the output radio frequency signal from said transmit unit, said receive unit providing an output signal condition corresponding to the channel to which said receiver is tuned; and, (g) means in the transponder unit responsive to an interogation signal from said central office for indicating whether said television receiver is on, and if so, the broadcast channel to which said receiver is tuned.

4. A system for monitoring the condition of a television broadcast receiver having:

(a) a transmit unit attached to said receiver including a radio frequency oscillator and means for modulating the output signal of said oscillator to identify the broadcast channel to which said receiver is tuned;

(b) a transponder unit located at a fixed position in the same building as said television receiver but remote therefrom and connected to a source of operating power independent of the supplying of operating power to said monitored television receiver;

(c) a central office including data processing equipment for registering information concerning the station to which said receiver is tuned;

(d) a signal channel connected between said central station and said transponder;

(e) a receive unit located with said transponder for receiving the output radio frequency signal from said transmit unit, said receive unit providing an output signal condition corresponding to the channel to which said receiver is tuned;

(f) said receive unit including a detector circuit for producing a signal having a frequency corresponding to the modulation frequency of the oscillator output signal, a plurality of separate signal channels connected to receive the output signal of the detector circuit and selectively tuned to be responsive to only a single one of the modulation frequencies, a bistable circuit element in each signal channel actuated in response to the presence of a signal in said signal channel at the frequency to which said signal channel is tuned, and means controlled by said bistable circuit for providing an indication of the broadcast channel to which said television receiver is tuned; and, (g) means in the transponder unit responsive to an interrogation signal from said central office for indicating whether said television receiver is on, and if so, the broadcast channel to which said receiver is tuned.

5. The system as defined in claim 4 wherein the means controlled by said bistable circuit elements also provide an indication of whether said television receiver is on or off.

6. The system as defined in claim 4 wherein said plurality of signal channels each contain a reed relay and the reed relays are all tuned to different frequencies that correspond identically with the modulation frequencies of the radio frequency oscillator output signal, and said bistable circuit element in each signal channel comprises a relay, and further comprising a plurality of output terminals corresponding to different broadcast channels, and means connecting contacts of the relays with said output terminals in an arrangement to provide said output signal condition of the receiver unit on a selected terminal corresponding to the broadcast channel to which the television receiver is tuned.

7. Apparatus for producing a remote indication of the broadcast channel to which a television receiver is tuned comprising:

(a) a transmit unit attached to said receiver including a radio frequency oscillator and means for modulating the output signal of said oscillator with an audio tone that is characteristic of the broadcast channel to which the receiver is tuned;

(b) a receive unit located at a position remote from but in the same building as said television receiver, said receive unit comprising:

(1) a detector circuit for producing a frequency corresponding to the modulation frequency of said oscillator output signal;

(2) a plurality of separate signal channels connected to receive the output signal of the detector circuit and selectively tuned to be responsive to only a single one of the modulation frequencies;

(3) a relay in each signal channel arranged to be actuated in response to the presence of a signal in said signal channel at the frequency to which said signal channel is tuned; and (4) circuit means connected to contacts on said relays for providing a manifestation of the broadcast channel to which said television receiver is tuned.

8. Apparatus as defined in claim 7 wherein the transmit unit further comprises a plurality of audio frequency tone generators, and switching circuit means for selectively connecting a tone generator to modulate the oscillator output circuit comprising a buffer circuit between each tone generator and the oscillator, a mechanical switch having a contact arm movable with the channel selector on the television receiver, and circuit means energizing a selected buffer circuit in response to the position of the contact arm of said mechanical switch.

9. Apparatus as defined in claim 8 wherein the radio frequency output signal from the transmit unit is coupled to wiring in the building that supplies operating power to both the television receiver and said receive unit.

10. Apparatus as defined in claim 8 wherein said audio frequency generators in the transmit unit comprise vibrating reed oscillators tuned to different frequencies and wherein said plurality of signal channels in the receive unit each contain a reed relay tuned to a frequency corresponding with one of the frequencies of said reed oscillators.

11. Apparatus as defined in claim 7 wherein last mentioned circuit means comprises a plurality of output terminals corresponding with different broadcast channels and means connecting the contacts of the relays with said output terminals to provide said manifestation of the broadcast channel to which said television receiver is tuned on a selected terminal.

References Cited

UNITED STATES PATENTS

| | | | |
|---|---|---|---|
| 2,674,512 | 4/1954 | Bogert et al. | 179—2 X |
| 3,148,245 | 9/1964 | Currey et al. | 179—2 |
| 3,281,695 | 10/1966 | Bass | 325—31 |
| 2,905,762 | 9/1959 | Rettie et al. | 179—5 |
| 3,093,795 | 6/1963 | Jones | 179—2 X |
| 3,207,850 | 9/1965 | Foreman | 179—5 |
| 3,058,065 | 10/1962 | Freeman et al. | 325—31 |

ROBERT L. GRIFFIN, Primary Examiner

WILLIAM S. FROMMER, Assistant Examiner

U.S. Cl. X.R.

179—2; 325—31; 340—202